United States Patent Office 3,264,232
Patented August 2, 1966

3,264,232
BUTYL RUBBER LATEX FOAM
Robert V. Lucke, Fanwood, N.J., assignor, by mesne assignments, to Esso Research and Engineering Company, Elizabeth, N.J., a corporation of Delaware
No Drawing. Filed Feb. 21, 1963, Ser. No. 260,301
8 Claims. (Cl. 260—2.5)

The invention relates to a method of manufacturing porous or cellular goods or masses of rubber or similar material from aqueous emulsions or dispersions of butyl rubber. It also relates to dispersions suitable for the direct production of cellular or porous masses.

An object of this invention is to provide a method of making goods or masses of rubber or similar material of a sponge-like or cellular structure direct from butyl rubber or concentrated aqueous emulsions or dispersions of butyl rubber or similar compositions.

Other objects of the invention are to provide emulsions or dipsersions of butyl rubber or related materials which are capable of, or can be rendered capable of, being formed into a froth and gelling on the application of heat without destroying or impairing the cellular or sponge-like structure; and to provide aqueous emulsions or dispersions which can be formed into a froth or cellular or sponge-like structure and containing substances which cause these emulsions to set to a gel upon heating or in the cold after a definite and controllable time interval.

In the past it has not been possible to prepare foams or cellular goods or sponge-like structures from butyl rubber because latices of butyl rubber do not form and hold a gel structure which maintains the foam during subsequent curing operations.

It has now been found, however, that the addition of 5 to 15 wt. percent of an agglomerated high solids SBR latex to the butyl latex overcomes the above disadvantages and allows the butyl latex to be submitted to conventional methods of foam formation. The agglomerated SBR latex is specific to this invention since other conventional latices, such as chloroprene latex, or a commercially available latex of a copolymer of 35 parts by weight of butadiene, 30 parts of styrene, and 35 parts of acrylonitrile are inoperable, forming only a weak gel which collapses completely when curing is attempted.

In the invention, an emulsion or dispersion of butyl rubber, to which has been added 5 to 15 wt. percent of agglomerated SBR latex has been added, or of a mixture of these or similar resins with suitable compounding ingredients, is provided with a froth forming or latter forming ingredient. To such dispersions are also added substances having delayed coagulating or gelling actions or which render the emulsions or dispersions capable of gelling by the application of heat.

Any suitable froth forming or lather forming substance may be employed. Soap or soap forming ingredients or saponin are suitable and desirable for this purpose, e.g., dibutyl ammonium oleate.

The mixture is then stirred vigorously to form a lather or frothy mass. This may be accomplished by any suitable apparatus which may be selected to give the desired fineness or coarseness to the cellular structure. For example, the froth or lather may be formed by beating or stirring the material with paddles of the wire mesh type or with stirrers of the type used in cake mixing or egg beating machines or it may be formed by blowing air or other suitable gas into the dispersions or emulsions either alone or in conjunction with beating or whipping devices. The froth or rubber dispersion thus obtained may be formed to any desired shape as for example by pouring it into open molds and permitting it to set. The mixture is then cured and dried.

To form a sufficiently strong lather or froth the mix or emulsion of the butyl rubber composition must have a sufficiently high viscosity. If the viscosity of the mix or emulsion is not inherently sufficient for this purpose, it may be increased by the addition of suitable means, but in so doing an ingredient must be selected that does not unduly increase the surface tension of the mix or emulsion and thus impair its froth forming characteristics.

The substances used for coagulating or gelling of the froth must also be such as not to inhibit or break down the frothing characteristics of the emulsion. Examples of suitable substances for use in conjunction with the dibutyl ammonium oleate are sodium or potassium silicofluoride, ammonium persulphate, nitro-propane, ammonium chloride, ammonium sulfate, ammonium nitrate or trioxymethylene or mixtures of these. The gelling agent either with or without compounding ingredients or coloring matter may be added to the froth or foam instead of to the unfrothed dispersion and the frothing may be then continued for a short time to insure an even distribution of these ingredients throughout the froth. In the event that a delay coagulating or gelling characteristic is present in the emulsion or dispersion, the froth will have been formed before such gelling or coagulation takes place or while the emulsion or dispersion is still in a reversible condition. When the gas has been incorporated with the emulsion or dispersions into a froth capable of standing, the subsequent gelling action converts the froth emulsion into an irreversible solid structure.

Where heat is employed to hasten the conversion of the froth or foam produced to a solid or sponge-like structure the temperature should not be so high as to cause a break down in the cell structure. For example, the temperature should not be above the boiling point of water or of the dispersion or emulsion. The size of the cell structure is attained entirely independent of the application of heat.

The butyl rubber latices used in the practice of this invention are dispersions of vulcanizable elastic copolymers of isoolefins and a small amount of diolefin. The copolymers useful in the present invention containing a major proportion, preferably at least 70 wt. percent of isoolefins, and a minor proportion, preferably not more than about 30 wt. percent of multiolefins. Copolymers of this general type, especially where the copolymer contains about 85–99.5% (preferably 95–99.5%) of a $C_4$–$C_7$ isoolefin such as isobutylene with about 15–0.5% (preferably about 5–0.5%) of a multiolefin of about 4–14 carbon atoms, are commonly referred to in patents and literature as "butyl rubber"; see, for example, the textbook "Synthetic Rubber" by G. S. Whitby (1954 edition, by John Wiley & Sons, Inc.), pages 608–609, etc. The expression "butyl rubber" as employed in the specification and claims is intended to include copolymers containing about 80–99% by weight of an isoolefin of about 4–7 carbon atoms and about 10–1% of a conjugated multiolefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$ conjugated diolefin, such as isoprene, butadiene, dimethyl butadiene, piperylene, etc.) The reaction product of isobutylene and isoprene is preferred.

The rubber is prepared as a solid crumb and is converted into a latex by dissolving in a hydrocarbon solvent such as hexane. Latices are suitably prepared from this solution by emulsifying with water in the presence of an alkali metal, alkaline earth metal, amine or ammonium salt of a $C_8$–$C_{11}$ organic sulfate and a monovalent salt of dihydrogen ortho-phosphate stabilizer as taught by the Brodkey Patent No. 2,955,094, or the alkali, amine or ammonium salt of organic ethers of polyoxyethylene sulfate having more than four ethylene oxide groups as taught by the Brodkey Patent No. 2,936,295. The disclosures of each of these patents are included herein by reference. A typical recipe for the preparation of these latices is as follows:

| | Parts |
|---|---|
| Solution of butyl rubber in hexane (23 wt. percent N.V.M.) | 70 |
| Water | 30 |
| Sodium salt of sulfated nonylphenoxypolyethoxy ethanol (per 100 parts rubber solids) | 1.3–2.5 |
| $NaH_2PO_4$ (per 100 parts rubber solids) | 1 |

In preparing these latices it is preferable to employ distilled water since tap water usually contains an amount of salt impurity equivalent to 0.25 phr. ammonium chloride. Such an amount will produce differences in viscosity of the order of 250 cps. However, tap water can be used if this difference is taken into consideration when adding the salt.

The latices thus prepared contain about 10–15% by weight of rubber solids. More concentrated latices (up to 55 to 65% by weight of rubber solids) can be prepared by passing an inert gas through the latex at 150° to 200° F. in order to strip off all of the solvent and enough of the water to give the desired concentration. In accordance with this invention, the viscosity can be increased by the addition of the desired salt as described above.

The SBR latex used in conjunction with the butyl rubber latex is suitably a latex prepared by emulsion polymerization of butadiene and styrene in a redox system at about 5° C., using a rosin-fatty acid emulsifier. Such latices may be agglomerated by the addition of solvents such as benzene, toluene or acetone, by neutralizing the soap emulsifier with an acid, or by carrying out the polymerization with an ammonium or amine soap and after completion of the polymerization, heating to drive off the ammonia. The agglomeration may also be induced by the addition of an electrolyte or by freezing. A particularly effective method is to cause agglomeration by the addition of colloidally active chemicals such as polyether polyamine, polyvinyl alcohol and polyvinyl methyl ether. These methods are described in an article by E. L. Borg, "Rubber and Plastics Age," vol. 42, No. 7, pages 868–874 (1961).

Through this invention a sponge material may be obtained of a volume density as low as 0.45 and a tensile strength of 360 p.s.i. Such a foam will have a compressibility of 5.7 lbs./sq. in.

The following examples illustrate how the process can be effected:

*Example 1*

A butyl latex was prepared by emulsifying a 23% N.V.M. solution of butyl rubber in hexane with distilled water in the presence of 5 parts (per hundred parts of rubber) of the sodium salt of sulfated nonylphenoxypolyethoxyethanol and 1 part (per hundred parts of rubber) of sodium dihydrogen phosphate. These latices were stripped of the hexane and concentrated to about 62% by weight total rubber solids content. The resulting latex has the following inspection.

| | |
|---|---|
| Butyl rubber, parts by weight | 268 |
| Total solids, wt. percent based on total recipe | 62 |
| Emulsifier, anionic type, wt. percent based on total recipe | 1.3 |
| Specific gravity, 70° F. | .95 |
| Density, lbs./gal. | 7.9 |
| pH [1] | 5–6 |
| Particle size, microns: | |
|     Average | 0.5 |
|     Range (95%) | 0.05–1.0 |
| Surface tension, dynes/cm. at 70° C. | 20–38 |

[1] By glass electrode.

*Example 2*

An SBR latex was prepared from the following recipe:

| | Parts by wt. |
|---|---|
| Water | 150. |
| Butadiene | 70. |
| Styrene | 30. |
| Potassium oleate | 3.25. |
| Potassium disproportionated rosin soap | 1.75. |
| Sodium naphthalene sulphonic acid-formaldehyde reaction product [1] | 0.5. |
| Tertiary dodecyl mercaptan | 0.1. |
| Di-isopropyl benzene hydroperoxide | 0.20. |
| Sodium formaldehyde sulphozylate dihydrate | 0.10. |
| Sodium dithionite | 0.03. |
| Sequestering agent [2] | 0.08. |
| Ferrous sulphate heptahydrate | Variable (0.01–0.02). |

[1] Daxad 11.
[2] Tetra-sodium salt of ethylene diamine tetraacetic acid.

The polymerization was carried out at 41° F., reaching 80% conversion in about 16 hours. At this point the polymerization was stopped by the addition of 0.1 part (based on above recipe) of potassium dimethyl dithiocarbamate. The unreacted monomers were removed and the latex agglomerated by the addition of electrolyte and polyvinyl methyl ether as described in the Borg article (supra). The resulting latex has the following typical properties.

| | |
|---|---|
| Total solids, wt. percent | 69.5 |
| pH | 10.2 |
| Average particle size, Angstroms | 2500 |
| Brookfield viscosity | 1500 |
| Polymer Mooney viscosity (ML–4 at 212° F.) | 140 |
| Polymer bound styrene, wt. percent | 26 |
| Surface tension, dynes/cm. | 40 |

*Example 3*

The butyl rubber latex of Example 1 was compounded according to the following recipe:

| | Parts by wt. |
|---|---|
| Butyl rubber latex (solids) | 90 |
| Agglomerated SBR latex of Example 2 | 10 |
| Triethyl trimethylene triamine | 1.5 |
| ZnO | 4.0 |
| Dibutyl ammonium oleate | 1.0 |
| Zinc salt of mercaptobenzothiozole | 1.5 |
| Zinc salt of dibutyl dithiocarbamate | 3.0 |
| Sulfur | 2.5 |
| Sodium oleate | 1.0 |
| Sodium silicofluoride | 6.0 |

The formulation was prepared by adding all of the previously dispersed ingredients with the exception of the sodium silicofluoride to the beater bowl. Beating was begun at moderately high speed at a temperature of 85–90° F. until about three to five times the original volume was obtained. Thereafter the speed was decreased so as not to destroy the froth created. This took about ten to fifteen minutes. When the full volume was reached the sodium silicofluoride was added over a thirty second period in a dilute form (20% solids). During this time the mixer was run up and down to insure good top to bottom uniformity in mixing the sodium silicofluoride. Gelatin occurred in about sixty seconds after the sodium silicofluoride had been added. The resulting froth was poured into molds previously coated with a mold release agent. The mold had been preheated to a 100–200° F. A covering was placed over the mold after the foam was in place to prevent loss of water and shrinkage before cure. The mold was then allowed to stand for fifteen to thirty minutes to allow the foam to completely "set." It was then placed in a hot air oven and cured at 280° F. for 90 minutes. Generally this time is reduced by half for each 18° F. increase in temperature. The mold was cooled, opened and the foam removed and washed to remove discolored materials. It was then dried by standing at room temperature for several days and then in an air oven at 140° F.

The nature of the present invention having been thus fully set forth and specific examples of the same given, what is claimed as new and useful and desired to be secured by Letters Patent is:

1. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate, which comprises incorporating 5 to 15 wt. percent of an agglomerated latex of a rubbery copolymer of butadiene and styrene, a frothing agent and a gelling agent into a dispersion of such material, forming said dispersion into a froth, and setting said froth to an irreversible gel.

2. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate like material which comprises incorporating 5 to 15 wt. percent of an agglomerated latex of a rubbery copolymer of butadiene and styrene, a frothing agent and a gelling agent into a dispersion of such material, forming said dispersion into a froth, setting said froth to an irreversible gel, and thereafter drying said froth.

3. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate like material which comprises incorporating 5 to 15 wt. percent of an agglomerated latex of a rubbery copolymer of butadiene and styrene, a frothing agent and a gelling agent into a dispersion of such material, forming said dispersion into a froth, setting said froth to an irreversible gel, and vulcanizing said irreversible gel in an atmosphere of steam.

4. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, and alkaline earth metal, amine and ammonium salts of a $C_8$ to $C_{11}$ organic sulfate like material which comprises incorporating 5 to 15 wt. percent of an agglomerated latex of a rubbery copolymer of butadiene and styrene, a soap and sodium silicofluoride into a dispersion of such material, forming said dispersion into a froth, and setting said froth to an irreversible gel.

5. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate like material which comprises incorporating 5 to 15 wt. percent of a polyvinyl methyl ether agglomerated latex of a rubbery copolymer of butadiene and styrene, sodium oleate and sodium silicofluoride into a dispersion of such material, forming said dispersion into a froth, and setting said froth to an irreversible gel.

6. A method of forming cellular structures of rubber like material which comprises incorporating sodium oleate and sodium silicofluoride into a dispersion of such materials, forming such dispersion into a froth, and setting said froth to an irreversible gel.

7. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of an alkali metal, amine and ammonium salts of organic ethers of polyoxyethylene sulfate which comprises incorporating 5 to 15 wt. percent of a polyvinyl methyl ether agglomerated latex of a rubbery copolymer of butadiene and styrene, sodium oleate and sodium silicofluoride into a dispersion of such material, forming said dispersion into a froth, and setting said froth to an irreversible gel.

8. A method of forming cellular structures of latices of a vulcanizable elastic copolymer of 80-99% by weight of an isoolefin of 4 to 7 carbon atoms and 1-10% by weight of a conjugated multiolefin of 4 to 10 carbon atoms, said latex being prepared by the aid of an anionic emulsifier chosen from the group consisting of the sodium salt of sulfated nonylphenoxypolyethoxy ethanol which comprises incorporating 5 to 15 wt. percent of a polyvinyl methyl ether agglomerated latex of a rubbery copolymer of butadiene and styrene, sodium oleate and sodium silicofluoride into a dispersion of such material, forming said dispersion into a froth, and setting said froth to an irreversible gel.

References Cited by the Examiner

UNITED STATES PATENTS

| | | | |
|---|---|---|---|
| 2,761,001 | 8/1956 | Eckert | 260—2.5 |
| 2,955,094 | 10/1960 | Brodkey et al. | 260—2.5 |
| 3,083,124 | 3/1963 | Rahmes | 260—2.5 |
| 3,215,647 | 11/1965 | Dunn | 260—2.5 |

SAMUEL H. BLECH, *Primary Examiner.*

N. F. OBLON, *Assistant Examiner.*